Patented Feb. 13, 1923.

1,445,174

UNITED STATES PATENT OFFICE.

JOSEPH L. ROSENFIELD, OF ALAMEDA, CALIFORNIA.

PEANUT BUTTER AND PROCESS OF MANUFACTURING THE SAME.

No Drawing. Application filed April 5, 1921. Serial No. 458,643. REISSUED

*To all whom it may concern:*

Be it known that I, JOSEPH L. ROSEN-FIELD, a citizen of the United States, and a resident of Alameda, in the county of Alameda and State of California, have invented a new and Improved Peanut Butter and Process of Manufacturing the Same, of which the following is a full, clear, and exact description.
This invention relates to a process of manufacturing peanut butter and seeks for its principal object to overcome certain inherent faults common to all peanut butters now being manufactured.
Many objections have been noted to peanut butters as now manufactured among which are the tendency of the oil to separate from the solids and rise to the top after standing a few weeks thereby presenting to the customer a poor looking and unsalable package; the tendency of the oil to become rancid; the tendency of the peanut butter to stick to the roof of the mouth and the impossibility of packing the same in waxed cartons.

By manufacturing peanut butter under the present process, the separation of the oils from the solids and rising of the same to the top of the package is eliminated, the possibility of the oil becoming rancid and the tendency of the same to stick to the roof of the mouth is also overcome in addition to the fact that the peanut butter thus obtained is capable of being packed in suitable waxed containers.

Another object in view resides in the possibility of manufacturing peanut butter by an improved process which does not call for or require the use of machinery other than that now employed.

A further object of the invention resides in the herein described process of manufacturing peanut butter which does not add to the expense of production but which at the same time produces a better quality and more palatable article.

With the above recited and other objects in view, some of which will appear hereafter as the nature and purpose of the process is more clearly understood, reference is made to the following specification and the appended claims forming a part of this application.

In carrying out the process in its preferred embodiment the peanuts are first ground in suitable grinding mills and the ground mass is then pressed to remove a goodly percentage of the oil by suitable means either of the hydraulic or expeller type. It should be noted that it is not necessary to extract all of the oil but it is desirable to extract a greater percentage from the ground mass. The oil thus obtained is then subjected to the process of hydrogenation while the resultant mass or peanut cake is broken up by rolls or other suitable milling device. While the hydrogenated oil is still hot, it is placed in a suitable mixing device with the pulverized peanut cake or mass and is reincorporated therewith. The mixture is now chilled by passing the same through suitable chilling rolls from which it is conducted to the moulds and packed. If it is to be packed in glass or tin containers, this preliminary chill is unnecessary.

As a modification of the process, the peanuts may be pressed to remove a percentage of the oil before the same are ground as it is necessary in any event to pulverize the resultant cake or mass but if this is done, a proper amount of salt is added at the time the hydrogenated oil and the pulverized cake or mass are mixed.

A further modification of which the process is capable admits of the use of peanut flour being toasted over super-heated rolls after the oil has been removed, the hydrogenation of the oil and reincorporation of the oil while still hot with the toasted peanut flour by mixing the same together and adding a proper amount of salt to the mixture.

A still further modification of the process consists in blanching the raw peanuts, i. e. removing the red skin and the germ or heart, pressing the oil from the nut by any suitable means such as a hydraulic or expeller press, breaking up or pulverizing the mass or peanut cake, and toasting the same, hydrogenating the oil and reincorporating the same while hot with the ground up and toasted cake or mass and adding a proper amount of salt during the mixing or reincorporation process. The advantage of this latter process would be that the oil would represent a virgin oil, such as is supposed to have qualities absent in products which have been subjected to heat.

The amount of hydrogenated oil added in any of these processes would vary and while it has been set forth that the oil used is the peanut oil which is extracted from the mass, it is to be understood that other edible oils suitable for the purpose which have been hydrogenated may be employed. In the hydrogenation of the oil it is preferable to bring the same to a point where it is at a melting point of approximately 98° F. However, this melting point value may be varied as it is thought that in hot climates it should be brought to a slightly higher melting point while in colder climates a lower melting point is preferable.

The product obtained by the above named process is a substantially inadhesive peanut butter of a homogeneous plastic mass and composed of comminuted nuts from which a portion of the normal oil content has been extracted and to which has been added to replace the extracted oil an edible hydrogenated oil. The hydrogenated oil which is added may be that portion of the peanut oil which was previously extracted and hydrogenated or any other hydrogenated, edible nut oil suitable for the purpose.

I claim:

1. The herein described process of manufacturing peanut butter which comprises removing from the peanuts the major portion of the oil, forming the residue into a mass or cake and mixing the said cake or mass with a hydrogenated edible oil while still hot.

2. The herein described process of manufacturing peanut butter which comprises removing from the peanuts a major portion of the oil and comminuting and mixing the resultant cake or mass with a hydrogenated edible oil while still hot.

3. The herein described process of manufacturing peanut butter which comprises extracting a major portion of the oil from the peanuts, comminuting the resultant mass, hydrogenating the oil thus obtained, and mixing said hydrogenated oil with the resultant comminuted mass to reincorporate the same herewith.

4. The herein described process of manufacturing peanut butter, which comprises grinding the peanuts, pressing the same to extract the major portion of the oil therefrom, forming the residue into a mass or cake, hydrogenating the extracted oil, comminuting the mass or cake residue, and mixing the hydrogenated oil obtained therefrom while still hot with the comminuted cake or mass to reincorporate the same therewith.

5. The herein described process of manufacturing peanut butter which comprises pressing a major portion of the oil from the peanuts and removing the same therefrom, comminuting the resultant cake or mass, hydrogenating the oil thus removed, reincorporating the hydrogenated oil with the comminuted cake or mass and adding salt thereto while mixing the same.

6. The herein described process of manufacturing peanut butter which comprises blanching the peanuts, pressing the oil from the nut, grinding and toasting the resultant mass, hydrogenating the oil obtained therefrom and reincorporating the same while still hot with the resultant toasted and ground mass and adding salt thereto while reincorporating the same.

7. The herein described process of manufacturing peanut butter, which comprises the roasting, blanching and removal of the germ or heart of the peanuts, grinding and pressing the same to extract the major portion of the oil therefrom, forming the residue into a mass or cake, hydrogenating the extracted oil obtained, comminuting the mass or cake residue, and mixing the hydrogenated oil thus obtained while still hot with the comminuted cake or mass to reincorporate the same therewith.

8. The herein described process of manufacturing peanut butter which comprises removing a portion of the oil from the peanuts, and incorporating with said peanuts a hydrogenated edible oil.

9. The herein described process of manufacturing peanut butter which comprises removing a portion of the oil from the peanuts, hydrogenating the oil removed and incorporating said oil with the batch from which said oil has been previously removed.

10. A substantially inadhesive plastic nut butter, comprising a homogeneous mass of comminuted nuts having a portion of the normal oil content replaced by a hydrogenated edible oil.

JOSEPH L. ROSENFIELD.